United States Patent [19]

Holbert

[11] Patent Number: 5,730,934

[45] Date of Patent: Mar. 24, 1998

[54] METHOD AND APPARATUS FOR STERILIZING PACKAGING TRX-349

[75] Inventor: Victor P. Holbert, Buffalo Grove, Ill.

[73] Assignee: Tetra Laval Holdings & Finance S.A., Pully, Switzerland

[21] Appl. No.: 728,723

[22] Filed: Oct. 11, 1996

[51] Int. Cl.$^6$ .................................................. C12M 1/12
[52] U.S. Cl. ........................ 422/24; 210/748; 422/1; 422/22; 435/173.1; 435/173.3; 435/287.4
[58] Field of Search .................. 210/748; 422/1, 422/22, 24; 435/173.1, 173.3, 287.4

[56] References Cited

U.S. PATENT DOCUMENTS

| | | | |
|---|---|---|---|
| 3,738,080 | 6/1973 | Reil | 53/180 |
| 3,911,642 | 10/1975 | Ernstsson et al. | 53/28 |
| 4,069,153 | 1/1978 | Gunther | 210/64 |
| 4,121,107 | 10/1978 | Bachman | 250/455 |
| 4,255,383 | 3/1981 | Schenck | 422/24 |
| 4,289,728 | 9/1981 | Peel et al. | 422/24 |
| 4,366,125 | 12/1982 | Kodera et al. | 422/295 |
| 4,375,145 | 3/1983 | Mosse et al. | 53/425 |
| 4,448,750 | 5/1984 | Fuesting | 422/20 |
| 4,590,740 | 5/1986 | Rodocker | 53/426 |
| 4,656,813 | 4/1987 | Baldini et al. | 53/410 |
| 4,797,255 | 1/1989 | Hatanaka et al. | 422/28 |
| 4,809,485 | 3/1989 | Nielsen | 53/503 |
| 4,848,063 | 7/1989 | Niske | 53/451 |
| 4,896,768 | 1/1990 | Anderson | 206/210 |
| 4,910,942 | 3/1990 | Dunn et al. | 53/425 |
| 5,047,072 | 9/1991 | Wertz et al. | 55/1 |
| 5,073,268 | 12/1991 | Saito et al. | 210/638 |
| 5,122,340 | 6/1992 | Shimamura et al. | 422/28 |
| 5,129,212 | 7/1992 | Duffey et al. | 53/426 |
| 5,135,714 | 8/1992 | Wang | 422/23 |
| 5,144,670 | 9/1992 | Negishi | 381/24 |
| 5,155,980 | 10/1992 | Mansson et al. | 53/551 |
| 5,158,816 | 10/1992 | Rausing | 428/35.8 |
| 5,213,759 | 5/1993 | Castberg et al. | 422/24 |
| 5,326,542 | 7/1994 | Sizer et al. | 422/291 |
| 5,348,665 | 9/1994 | Schulte et al. | 210/748 |
| 5,350,568 | 9/1994 | Tuckner et al. | 422/300 |
| 5,433,920 | 7/1995 | Sizer et al. | 422/24 |
| 5,445,793 | 8/1995 | Tuckner et al. | 422/28 |
| 5,489,022 | 2/1996 | Baker | 206/439 |
| 5,494,691 | 2/1996 | Sizer | 426/392 |

FOREIGN PATENT DOCUMENTS

9218170  10/1992  WIPO.

*Primary Examiner*—Ardin H. Marschel
*Attorney, Agent, or Firm*—Michael A. Catania

[57] ABSTRACT

A method and apparatus for sterilizing packaging through irradiation with an excimer ultraviolet lamp which may be integrated on a packaging machine. The excimer ultraviolet lamp emits radiation at a substantially monochromatic wavelength within the ultraviolet band of the electromagnetic spectrum. The excimer ultraviolet lamp is composed of a quartz shell containing one of the following gaseous compounds: $Ar_2$, $Kr_2$, $Xe_2$, ARCl, KrCl, KrF or XeCl. The KrCl gas excimer ultraviolet lamp which generates a wavelength of 222 nanometers is of particular interest for the present invention. In one embodiment, the lamp has a central aperture for flowing through a cooling fluid to remove heat from the lamp. If the excimer ultraviolet lamp is integrated on a form, fill and seal machine, the cooling fluid may be the desired contents filled into a container fabricated on the form, fill and seal machine. The materials sterilized by the present invention are fabricated into many different containers such as flexible pouches, stand-up pouches, parallelpiped containers and gable top cartons. The material may be subjected to a sterilant prior to irradiation by the excimer ultraviolet lamp. The sterilant may be hydrogen peroxide, ozone or the like.

25 Claims, 7 Drawing Sheets

METHOD AND APPARATUS FOR STERILIZING PACKAGING TRX-349

TECHNICAL FIELD

The present invention relates to an apparatus and method for sterilizing packaging through irradiation with ultraviolet light. Specifically, the present invention relates to apparatus and method for sterilizing packaging through irradiation with an excimer ultraviolet lamp.

BACKGROUND

It is well known that heat-sealable polymer materials may be fabricated into disposable containers for the packaging of liquids and other flowable materials. These containers are commonly used as consumer packaging for containing fruit juices and milk, and may have the form of a flexible pouch or parallelpiped container. The containers, once filled with a desired contents and sealed at a production center, are transported to a store for the ultimate distribution to the consumer. The consumer, with his or her subjective preferences, will have the choice of purchasing a flowable material contained in a flexible pouch or parallelpiped container, or in a more traditional package such as a plastic bottle, paper carton or metal can. In order to overcome the consumer's time-fortified preferences for the more traditional packaging, the disposable polymer containers must be able to provide the consumer with an assurance that the polymer container is safe (the contents) and is able to withstand the same handling treatment as the traditional package.

A polymer container as consumer packaging for flowable materials has numerous advantages over traditional packages such as glass bottles, paper cartons and high density polyethylene jugs. Compared to these traditional packages, a polymer pouch or parallelpiped container consumes less raw material, requires less space in a landfill, is recyclable, can be processed easily, requires less storage space, requires less energy for chilling because of increased heat transference, and can be readily incinerated. A polymer pouch is also reusable as a general purpose storage bag.

Flowable materials are usually packaged in a polymer pouches or parallelpiped containers through a vertical form, fill and seal machine. The operation of the form, fill and seal machine commences with the unwinding of a web of thermoplastic film which is then formed into a continuous tube in a tube forming section, by sealing the longitudinal edges of the film together to form a fin seal (the forming aspect of the machine). The tube thus formed is pulled vertically toward a filling station. The tube is then collapsed across a transverse cross-section of the tube, the position of the cross-section being at a sealing device. The sealing device makes a first transverse heat seal at the collapsed portion of the tube thereby creating an airtight seal across the tube. The sealing device generally comprises a pair of jaws which contain a heating element, the jaws closing upon the tube and the heating element heating to form the airtight seal. Subsequent to sealing the tube and prior to the opening of the jaws, a predetermined quantity of a desired contents is deposited into the tube to a predetermined level upward from the first transverse seal (the filling aspect of the machine). The tube is then moved downward to a predetermined position whereby the level of the desired contents is below the jaws of the sealing device. The jaws of the sealing device are again closed, thereby collapsing the tube at a second transverse section and creating a second transverse heat seal (the sealing aspect of the machine). During the second closing of the jaws, the sealing device clamps, seals and severs the tube transversely. A pouch filled with a flowable material is now ready for further transportation. For the parallelpiped container, subsequent to the severing of the tube, the container is further manipulated to form the parallelpiped container shape. Also, the parallelpiped container is turned into a substantially rectangular shape prior to the first transverse sealing. Thus, during the second closing, the sealing device has sealed the top of the filled pouch, severed this pouch from the rest of the tube, and sealed the bottom of the next-to-be filled pouch. An example of a form, fill and seal machine is the TETRA POUCH™, available from Tetra Pak, Inc., Chicago, Ill.

In the production of flowable materials in polymer containers, efficiency is measured by the speed in which such containers may be formed, filled and sealed. One aspect of the machines which may lead to decreased efficiency is the sterilization process for aseptic packaging. Presently, the sterilization process involves ultraviolet irradiation of the material prior to filling of the containers with a desired contents. The present ultraviolet sterilization apparatus involves a series of parallel mercury lamps, aluminum reflectors and a water cooling system contained within glass cover. These lamps operate at very high temperatures which have the possibility of damaging the material undergoing sterilization. The exposure time required for an effective kill greatly decreases the speed at which these machines may be operated at during production. An example of such a patent is Bachman, U.S. Pat. No. 4,121,107, for an Apparatus For Automatic Low-Bacteria To Aseptic Filling And Packing Of Foodstuffs which discloses an apparatus that exposes the packaging material to a set of ultraviolet light radiating mercury lamps for at least one second.

Another method for sterilizing packaging material is to utilize pulses of light to irradiate the material. An example of such a method is Dunn et at, U.S. Pat. No. 4,871,559, for Methods For Preservation Of Foodstuffs. Dunn et al discloses a method to use pulsed ultraviolet light originating from a flashlamp system to sterilize food packaging. Such a system generates high temperatures and also generates polychromatic radiation.

What is needed is a sterilization apparatus which may be integrated with a current form, fill and seal machine, which is capable of effectively sterilizing packaging material without decreasing the operation speed of the machine, and which does not generate excessively high temperatures.

SUMMARY OF THE INVENTION

The present invention provides a sterilization apparatus to meet the unfulfilled needs of the packaging industry. The present provides for the effective sterilization of packaging material in an expedited manner while not generating excessively high temperatures.

One aspect of the present invention is an apparatus for sterilizing a tubular material. The apparatus comprises an ultraviolet radiation source having an aperture therethrough for cooling by a flowing content. The ultraviolet radiation source has a perimeter substantially similar to the tubular material and is disposed within the tubular material. The ultraviolet radiation source may be an excimer ultraviolet lamp. The ultraviolet radiation source may emit a substantially monochromatic wavelength. The excimer ultraviolet lamp may be composed of a quartz shell containing a gas. The gas may be selected from the group consisting of $Ar_2$, $Kr_2$, $Xe_2$, ARCl, KrCl and XeCl. The ultraviolet radiation source may be cylindrical in shape and have the aperture through the center for cooling by a flowing content. The ultraviolet radiation source may have an elliptical shape and have the aperture through the center for cooling by a flowing content. The tubular material may be a partially-formed gable top carton. The tubular material may be sterilized at a rate of twenty centimeters per second. The tubular material may be subjected to a sterilant prior to irradiation by the ultraviolet radiation source. The ultraviolet radiation source may provide uniform sterilization of the tubular material.

Another aspect of the present invention is a method for sterilizing a tubular material. The method comprises first passing the interior surface of the tubular material by an ultraviolet radiation source. The ultraviolet radiation source has an aperture therethrough and a perimeter substantially similar to the tubular material. The ultraviolet radiation source emits a radiation sufficient to substantially sterilize the tubular material. The next step is cooling the ultraviolet radiation source by moving a flowing contents through the aperture of the ultraviolet radiation source.

The ultraviolet radiation source may be an excimer ultraviolet lamp. The ultraviolet radiation source may emit a substantially monochromatic wavelength. The excimer ultraviolet lamp may be composed of a quartz shell containing a gas. The gas may be selected from the group consisting of $Ar_2$, $Kr_2$, $Xe_2$, ARCl, KrCl and XeCl. The ultraviolet radiation source may be cylindrical in shape and have the aperture through the center for cooling by a flowing contents. The ultraviolet radiation source may have an elliptical shape and have the aperture through the center for cooling by a flowing contents. The tubular material may be a partially-formed gable top carton. The tubular material may be sterilized at a rate of twenty centimeters per second. The tubular material may be subjected to a sterilant prior to irradiation by the ultraviolet radiation source. The ultraviolet radiation source may provide uniform sterilization of the tubular material. The method may further comprise the step of subjecting the tubular material to a sterilant prior to the step of passing the interior surface of the tubular material by the ultraviolet radiation source.

Still another aspect of the present invention is an apparatus for sterilizing a material undergoing fabrication into a container on a form, fill and seal machine where the container is filled with a desired contents. The apparatus comprises an ultraviolet radiation source having an aperture therethrough for cooling by the desired contents. The ultraviolet radiation source has a perimeter substantially similar to the material undergoing fabrication into a container. The ultraviolet radiation source is disposed on the form, fill and seal machine within the material undergoing fabrication into a container.

The ultraviolet radiation source may be an excimer ultraviolet lamp. The ultraviolet radiation source may emit a substantially monochromatic wavelength. The excimer ultraviolet lamp may be composed of a quartz shell containing a gas. The gas may be selected from the group consisting of $Ar_2$, $Kr_2$, $Xe_2$, ARCl, KrCl and XeCl. The ultraviolet radiation source may be cylindrical in shape and have the aperture through the center for cooling by a flowing contents. The ultraviolet radiation source may have an elliptical shape and have the aperture through the center for cooling by a flowing contents. The tubular material may be sterilized at a rate of twenty centimeters per second. The tubular material may be subjected to a sterilant prior to irradiation by the ultraviolet radiation source. The ultraviolet radiation source may provide uniform sterilization of the tubular material.

The form, fill and seal machine may fabricate the material into a pouch. Alternatively, the form, fill and seal machine may fabricate the material into a parallelpiped container. The apparatus may be disposed along the form, fill and seal machine subsequent to a longitudinal sealing of the material, in flow communication with a filling tube and prior to a transverse sealing of the material.

Still another aspect of the present invention is a method for sterilizing a material undergoing fabrication into a container on a form, fill and seal machine where the container will be filled with a desired contents. The method comprises a first step of passing the interior surface of the material by an ultraviolet radiation source. The ultraviolet radiation source has an aperture therethrough and a circumference substantially similar to the material. The ultraviolet radiation source emits a radiation sufficient to substantially sterilize the material. The next is cooling the ultraviolet radiation source by flowing the desired contents through the aperture of the ultraviolet radiation source.

The method may further comprise the step of subjecting the tubular material to a sterilant prior to the step of passing the interior surface of the material by the ultraviolet radiation source. The method may still further comprise the step of forming the material into a pouch subsequent to the step of cooling the ultraviolet radiation source. The method may still further comprise the step of forming the material into a parallelpiped container subsequent to the step of cooling the ultraviolet radiation source wherein the form, fill and seal machine fabricates the material into a parallelpiped container.

The method may further comprise several additional steps. The first additional step is sealing the material longitudinally prior to the step of passing the interior surface of the material by the ultraviolet radiation source. The next additional step is sealing the material transversely subsequent to the step of passing the interior surface of the material by the ultraviolet radiation source thereby partially forming the container. The final additional step is filling the partially formed container with the desired contents subsequent to the step of sealing the material transversely.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE DRAWINGS

Several features of the present invention are further described in connection with the accompanying drawings in which:

There is illustrated in FIG. 1 a top cross-section view of a preferred embodiment of an excimer ultraviolet lamp of the present invention.

There is illustrated in FIG. 2 a side view of an apparatus of the present invention integrated on a vertical form, fill and seal machine.

There is illustrated in FIG. 3 a cross-section side view of an apparatus of the present invention integrated on a vertical form, fill and seal machine.

There is illustrated in FIG. 4 an aseptic pouch sterilized in accordance with the present invention.

There is illustrated in FIG. 5 a parallelpiped container sterilized in accordance with the present invention.

There is illustrated in FIG. 6 a schematic view of one embodiment of an apparatus of the present invention integrated on a conveying system for gable top cartons.

There is illustrated in FIG. 7 a schematic view of an alternative embodiment of an apparatus of the present invention integrated on a conveying system for gable top cartons.

DETAILED DESCRIPTION OF THE PREFERRED EMBODIMENTS

The present invention applies to the sterilization of packaging materials undergoing fabrication to an aseptic container. Such an aseptic container may take the form of a flexible pouch, a stand-up pouch, a parallelpiped container, a gabled top carton, or the like. An application of the present invention is with the fabrication of a container on a vertical form, fill and seal machine which is utilized to manufacture flexible pouches, stand-up pouches and parallelpiped containers. Another application of the present invention is with containers fabricated along a horizontal conveyance system such as that used for the fabrication of gabled top cartons. Although application of the present invention has been described in reference to fabrication with the above-mentioned containers, those skilled in the pertinent art will recognize that the application of the present invention with the fabrication of other containers are within the scope of the present invention.

Excimer Ultraviolet Technology

The present invention is based on excimer ultraviolet technology. Excimers are evanescent, electronically excited molecular complexes which exist only under unique conditions. The excimer is in an excited state as opposed to a ground state. In this excited state, elements such as the noble gases which are normally unreactive, are able to bind to one another or to other elements. Excimers usually disintegrate within a microsecond of formation and emit their binding energy as a photon as the two elements return to the ground state. For ultraviolet applications, the excimers formed from noble gas atoms or excimers formed from a noble gas and a halogen are of particular importance. Some of the more well known ultraviolet excimers include $Ar_2$, $Kr_2$, $Xe_2$, ARCl, KrCl, KrF and XeCl. These molecular complexes are ultraviolet excimers because the disintegration of the excimer, excited dimer, results in an emission in the ultraviolet range of the electromagnetic spectrum. For example, the emission from KrCl has a wavelength of 222 nanometers ("nm"), the emission from KrF has a wavelength of 248 nanometers, the emission from $Xe_2$ has a wavelength of 172 nm, and the emission from XeCl has a wavelength of 308 nm. Although several ultraviolet excimers have been mentioned in reference to the present invention, those skilled in the pertinent art will recognize that other ultraviolet excimers may be employed in practicing the present invention without departing from the scope of the present invention.

An example of the excimer process for xenon is as follows. First, a xenon atom in the ground state is excited by interaction with an electron to an excited state. Next, this excited xenon atom reacts with a ground state xenon atom to form an excimer complex. Within a microsecond after formation, the xenon atoms dissociate to two ground state xenon atoms and doing so emit an ultraviolet photon.

The present invention involves an excimer ultraviolet lamp in which a gas capable of forming excimers is hermetically sealed within a quartz glass shell. The gas may be a noble gas or a mixture of noble gas and a halogen. Electrons are generated by electrodes located outside of the shell and separated by a discharge gap. In a preferred embodiment, the excimer ultraviolet lamp is cylindrical in shape having an aperture therethrough the center. In this embodiment, one electrode is juxtaposed to the exterior surface of the ultraviolet lamp while the second electrode is juxtaposed on the interior surface of the cylinder of the ultraviolet lamp.

Figure 1:
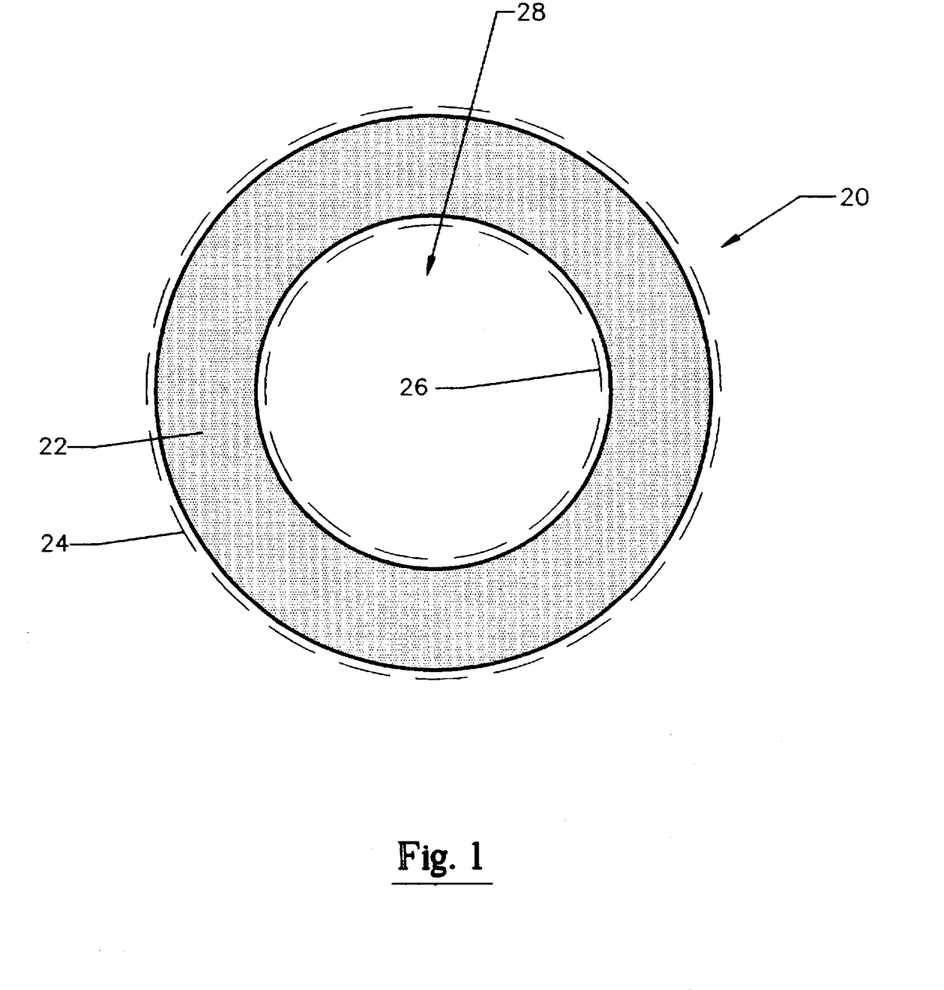

There is illustrated in FIG. 1 a top cross-section view of a preferred embodiment of an excimer ultraviolet lamp of the present invention. As shown in FIG. 1, an excimer ultraviolet lamp is generally designated 20. The excimer ultraviolet lamp 20 is generally comprised of a cylindrical shell 22, an outer electrode 24, an inner electrode 26 and a central aperture 28. There is sealed within the cylindrical shell 22 a gas which is reacted to form excimers. The gas is electrically excited by an alternating voltage which causes a current flow in the discharge gap established between the inner electrode 26 and the outer electrode 24. The ultraviolet radiation generated by the excimers is generally directed outward from the cylindrical shell 22.

The excimer ultraviolet lamp 20 of the present invention operates at a significantly lower temperatures than traditional mercury based ultraviolet lamps. However, the excimer ultraviolet lamp 20 of the present invention still requires cooling to prevent overheating of the lamp 20 and whatever materials are being sterilized by the lamp 20. To that end, a cooling fluid flows through the central aperture 28 thereby removing heat from the excimer ultraviolet lamp 20. The cooling fluid is maintained at a predetermined temperature which is below the operating temperature of the excimer ultraviolet lamp 20 in order for the cooling fluid to act as a heat sink to remove heat from the lamp 20 as the cooling fluid flows through the central aperture 28.

Figure 2:
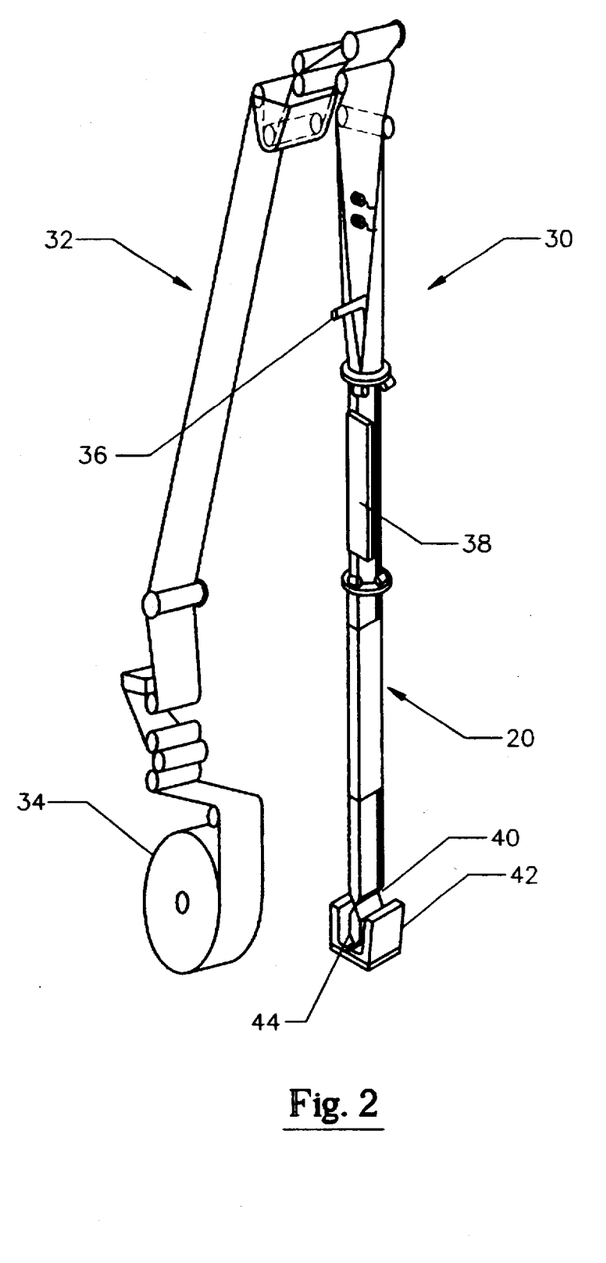

There is illustrated in FIG. 2 a side view of an apparatus of the present invention integrated on a vertical form, fill and seal machine. As shown in FIG. 2, the excimer ultraviolet lamp 20 is integrated on a vertical form, fill and seal machine generally designated 30. A material 32, undergoing fabrication to a container shape and originating from a coil of material 34, encompasses the lamp 20. On the form, fill and seal machine 30 is a filling pipe 36 which provides for the flow of a desired contents into a partially formed container. The filling pipe 36 is attached to a source of the desired contents on one end, and open on the other end for distribution of the desired contents into a partially formed container. Downstream from the filling pipe 36 is a longitudinal sealer 38. The longitudinal sealer 38 seals the material 32 longitudinally thereby forming an enclosed tubular material. Further downstream is the excimer ultraviolet lamp 20 which is encompassed by the material 32. Subsequent to the lamp 20 is the transverse sealer 40 which seals the material transversally prior to filling with a desired contents. At the same time the bottom of one container is being sealed, the top of another container is being sealed. The filled and sealed containers are cut from the rest of the material 32 by a cutting jaw 42. Subsequent to the cutting jaw 42, the newly formed container 44 may be further manipulated into a parallelpiped container, a stand-up pouch, or the like.

As the material 32 passes by the excimer ultraviolet lamp 20, the material 32 is sterilized by the ultraviolet radiation which is generated at a substantially monochromatic wavelength by the excimer ultraviolet lamp 20 as described above. The material 32 may be sterilized at a preferred rate of twenty centimeters per second. However, the form, fill and seal machine 30 may be operated at various rates depending on the material. In addition to the sterilization by the excimer ultraviolet lamp 20, a sterilant may be sprayed on the material 32 prior to irradiation by the lamp 20 to enhance sterilization of the material 32. The sterilant would be sprayed on the material 32 at a station upstream on the form, fill and seal machine 30. The sterilant may be hydrogen peroxide, ozone or the like. The concentration of sterilant would correspond to the needs of the material 32 in relation to the sterilization by the excimer ultraviolet lamp 20. A preferred gas for the excimer ultraviolet lamp 20 is KrCl which emits a wavelength of 222 nm. The KrCl gas excimer ultraviolet lamp 20 may be utilized with or without a sterilant.

Figure 3:
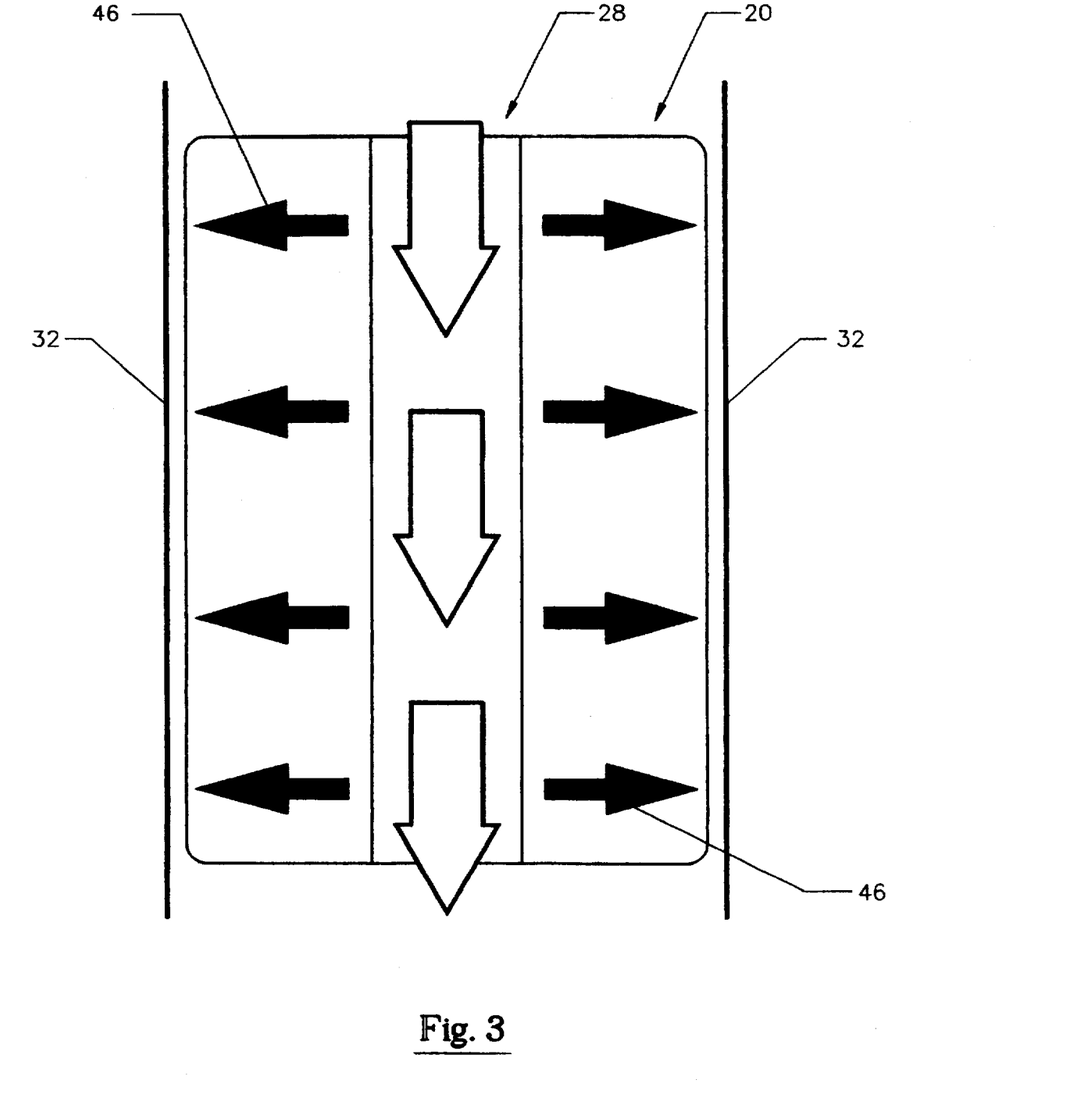

There is illustrated in FIG. 3 a cross-section side view of an apparatus of the present invention integrated on a vertical form, fill and seal machine. As shown in FIG. 3, this embodiment of the excimer ultraviolet lamp 20 is generally cylindrical in shape having a cylindrical central aperture 28 in which a desired contents to be packaged flows therethrough. The desired contents, which is to packaged in the container fabricated on the form, fill and seal machine, is the cooling fluid which acts as a heat sink to remove heat from the lamp 20 as the desired contents flows through the central aperture 28. The placement of the apparatus of the present invention on a vertical form, fill and seal machine provides for the sterilization of a material 32 as it undergoes fabrication into a container. The material 32 encompasses the lamp 20 as the material 32 is pulled downward for a first transverse sealing, a filling with the desired contents and then a second transverse sealing which also cuts the filled container from the other material 32 on the machine 30. In a preferred embodiment, the apparatus of the present invention is placed subsequent to the longitudinal sealing of the material 32 and prior to the first transverse sealing of the material 32. However, those skilled in the pertinent art will recognize that the apparatus of the present invention may be placed at other locations on the form, fill and seal machine without departing from the scope of the present invention.

As the material 32 is pulled downward, ultraviolet radiation sterilizes the soon to be interior of a container as indicated by the radiation arrows 46. The cylindrical shape of this embodiment of the excimer ultraviolet lamp 20 for the substantial irradiation of the material 32 as it is pulled downward pass the lamp 20. In this manner, the material is sterilized within milliseconds thereby allowing for an accelerated operation of the form, fill and seal machine 30.

Pouch Fabrication

Figure 4:
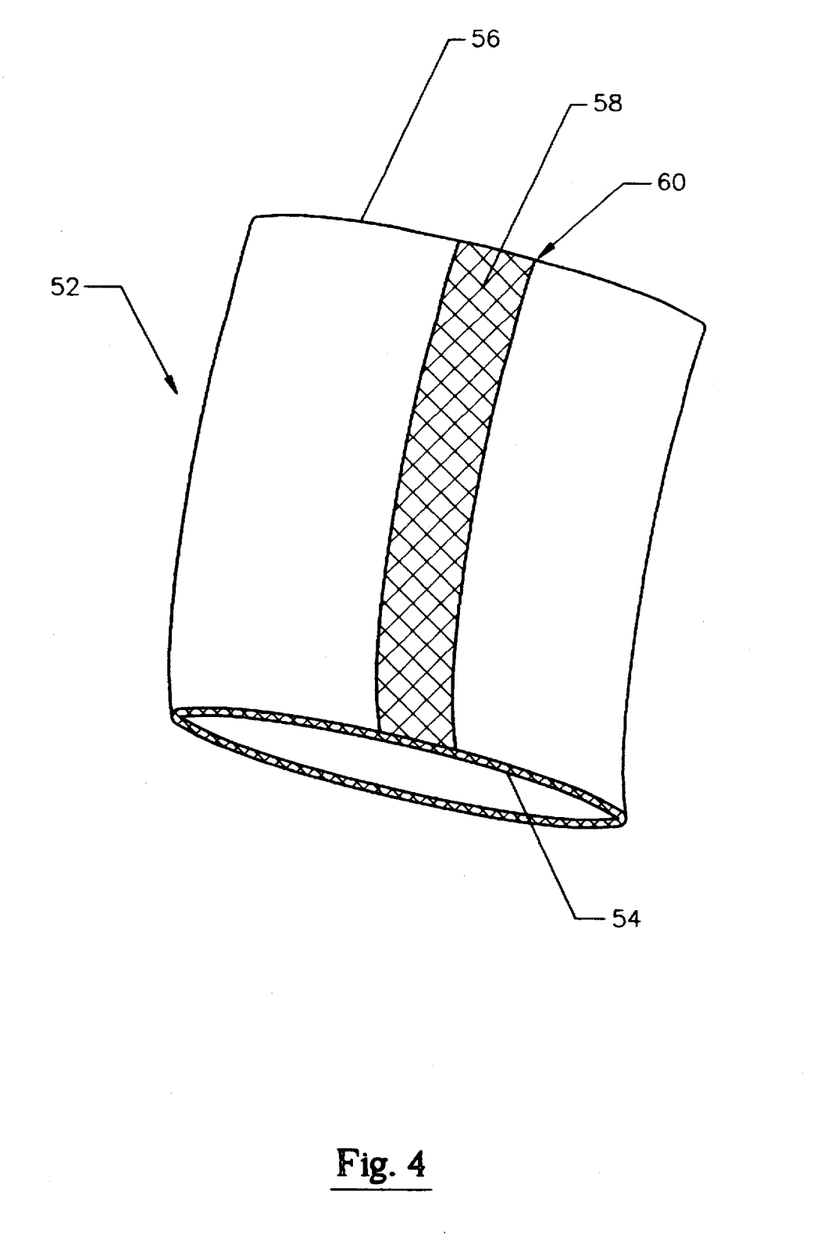

The present invention encompasses various packaging for flowable materials. A preferred packaging is a flexible pouch for flowable materials. An example of such a pouch is illustrated in FIG. 4. The pouch of FIG. 4 may be fabricated on a vertical form fill and seal ("VFFS") machine as previously described. A pouch embodying one aspect of the present invention is generally designated 52. The pouch 52 has a first transverse seal 54, a second transverse seal 56, a longitudinal seal 58, and an unsealed longitudinal overlap 60. Fabrication of the pouch 52 commences with a film being fed into a VFFS machine, as described in FIG. 2, whereby it is converted into a tubular form. The film is converted to the tubular form by sealing the longitudinal edges of the film together. The sealing may be accomplished either by overlapping the film and sealing the film using an inside/outside seal, or by fin sealing the film using an inside/inside seal. An example of a inside/outside seal is illustrated in FIG. 4 where longitudinal seal 58 overlaps the inside surface of a film with the outside surface of the film thereby creating longitudinal seal 58 and the unsealed overlap 60.

The first transverse seal 54 is formed by a sealing bar which transversely seals the bottom of pouch 52. Prior to making the first transverse seal 54, the film is sterilized by apparatus of the present invention as described in reference to FIG. 1. Then, a flowable material such as fruit juice is longitudinally added to the pouch 52. The sealing bar then seals the top end of the pouch 52 thereby creating the second transverse seal 56. The sealing bar also detaches pouch 52 from the tubular film by burning through the film or by cutting through the film. An example of such a sealing bar is disclosed in Reil, U.S. Pat. No. 3,738,080, for a Packing Machine. The capacity of pouch 52 may vary from 10 milliliters to 10 liters. The present invention enables a VFFS machine to operate at a higher capacity while producing aseptic pouches. Although the present invention has been described in reference to a VFFS, those skilled in the art will recognize that other packaging machines, such as a horizontal form, fill and seal machine, without departing from the scope of the present invention.

Parallelpiped Container Fabrication

Fabrication of a parallelpiped container is similar to that of a flexible pouch. Both containers are fabricated on a vertical form, fill and seal machine from a polymer material. However, there are variations in the fabrication process and the material. The epitome of parallelpiped containers is the TETRA BRIK® which may be fabricated in a method disclosed in Niske, U.S. Pat. No. 4,848,063 for a Method Of Manufacturing Packaging Container which is hereby incorporated by reference in its entirety.

Figure 5:
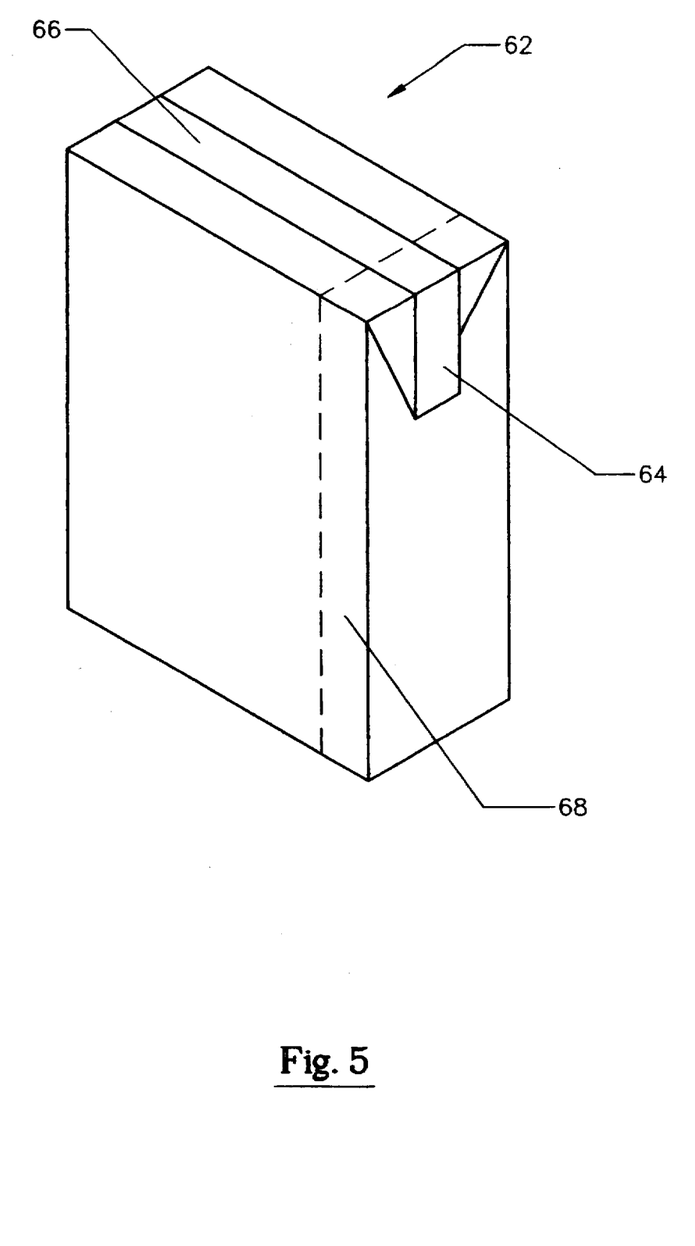

There is illustrated in FIG. 5 a parallelpiped container sterilized in accordance with the present invention. As shown in FIG. 5, the parallelpiped container is generally designated 62. The parallelpiped container 62 has a triangular flap forming panel 64, a transverse seal tab forming panel 66 and a longitudinal seal flap 68. In a preferred embodiment, the longitudinal seal creating the longitudinal seal flap 68 is made prior to sterilization with the excimer ultraviolet lamp 20 on a form, fill and seal machine. Subsequent to sterilization, the first transverse seal is made, the container 62 is filled, and a second transverse seal is made thereby creating the transverse seal tab forming panel 66. The container 62 is further manipulated to form the familiar parallelpiped shape.

Gable Top Carton Sterilization

Unlike the previously discussed containers, the gable top carton is not fabricated on vertical form, fill and seal machine. However, similar to the other containers, the gable top carton has a tubular form, albeit a square tubular form, which may be sterilized using the present invention. Similar to the other containers, the excimer ultraviolet lamp 20 is disposed within the gable top carton thereby sterilizing the interior of the carton with ultraviolet radiation.

Figure 6:
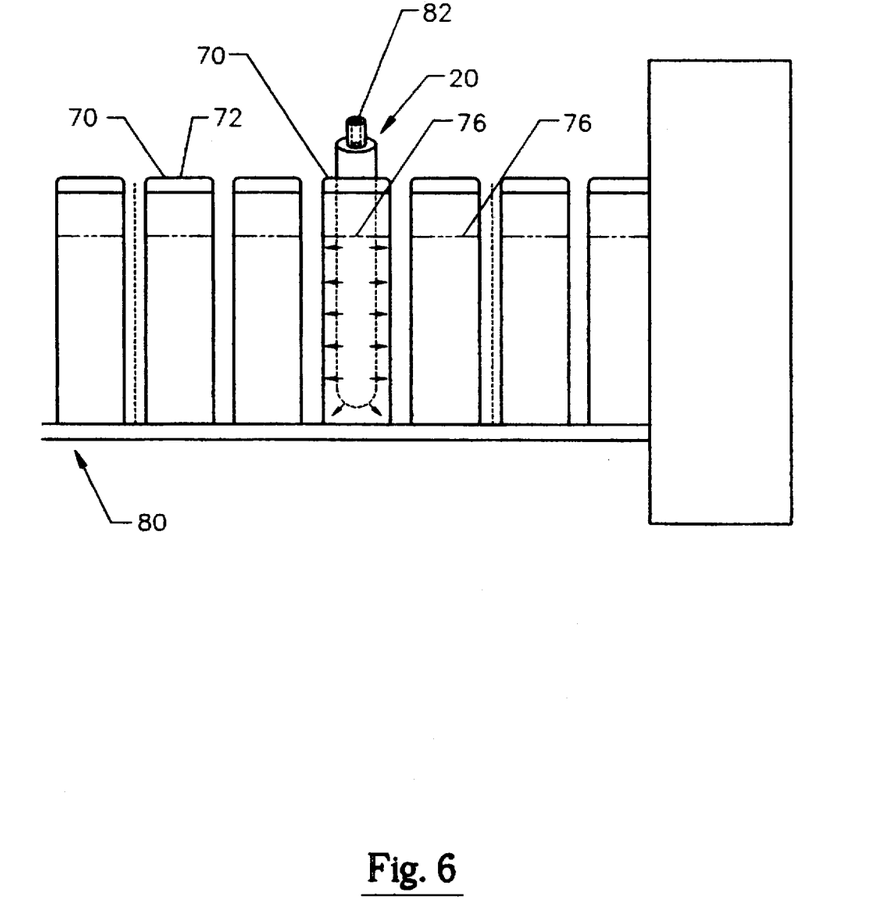
Figure 7:
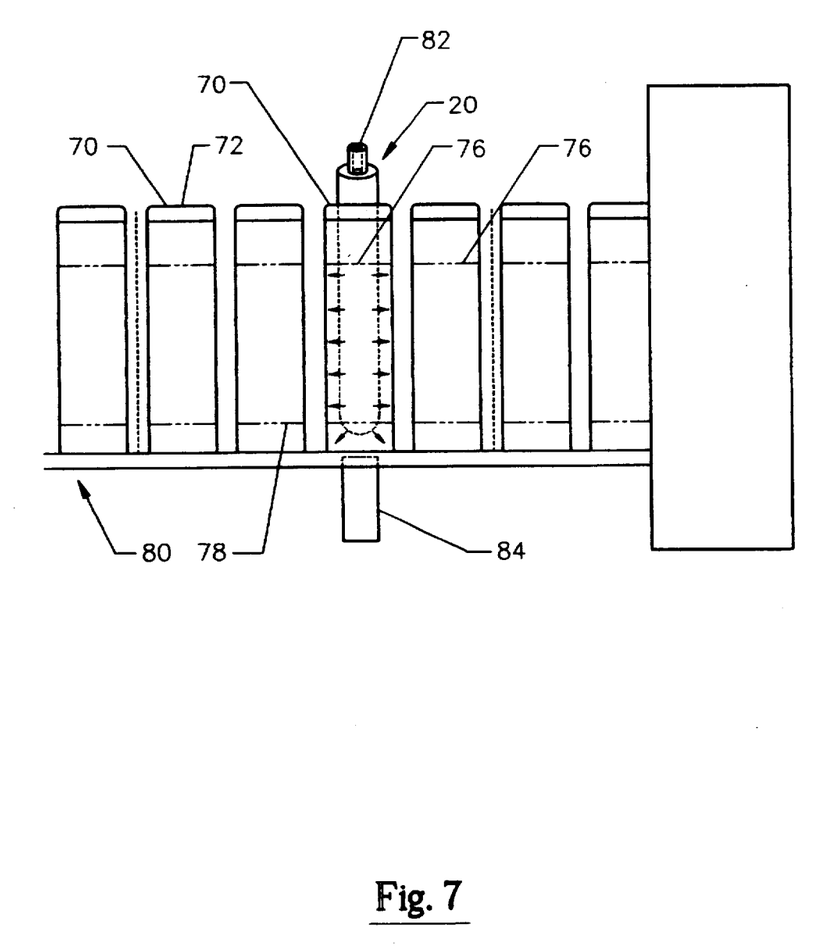

There is illustrated in FIG. 6 a schematic view of one embodiment of an apparatus of the present invention integrated on a conveying system for gable top cartons. There is illustrated in FIG. 7 a schematic view of an alternative embodiment of an apparatus of the present invention integrated on a conveying system for gable top cartons. As shown in FIGS. 6 and 7, a series of partially-formed cartons 70 are conveyed along a conveyor system 80. Each of the cartons 70 are erected upright having an open top 72, a top fin 74, a top score line 76 and a bottom score line 78. The ultraviolet lamp 20 is placed within the interior of the carton 70 through the open top 72.

There is in flow communication with the central aperture 28 of the ultraviolet lamp 20 a cooling fluid source pipe 82 at a top end of the central aperture 28, and in the embodiment shown in FIG. 7, a discharge pipe 84 on the bottom end of the central aperture 28. The cooling fluid source pipe 82 dispenses a cooling fluid to the ultraviolet lamp 20. In the embodiment shown in FIG. 6, the cooling fluid flows down the sides of the central aperture 28 removing heat from the ultraviolet lamp 20. Then the cooling fluid flows upward through an internal discharge pipe 86, not shown, disposed within the cooling fluid source pipe 82. The cooling fluid flows upward through the internal discharge pipe 86 by a vacuum means. In this embodiment, the bottom of the carton 70 may be sealed closed for filling with a desired contents.

In the embodiment shown in FIG. 6, the cooling fluid flows from the cooling fluid source pipe 82, through the central aperture 28 and into the discharge pipe 84. In this embodiment, the bottom of the carton 70 is open allowing for the connection between the discharge pipe 84 and the central aperture 28 of the ultraviolet lamp 20. In both FIGS. 6 and 7, the score lines 76 and 78 designate where the carton 70 is folded to form the familiar gable top carton shape. The fin 74 is where the sides of the carton 70 are sealed together. In either embodiment shown in FIGS. 6 and 7, substantially all of the interior of each carton 70 is sterilized by the ultraviolet radiation generated by the excimer ultraviolet lamp 20. Also, at a previous station along the conveyor system 80, a sterilant such as hydrogen peroxide or ozone may be sprayed into the cartons to enhance the sterilization of the cartons by the excimer ultraviolet lamp 20.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. An apparatus for sterilizing a tubular packaging material being fabricated on a form, fill and seal packaging machine, the apparatus in flow communication with a source of a flowable food product, the apparatus comprising:
    an excimer ultraviolet lamp having an aperture therethrough for cooling by the flowable food product, the excimer ultraviolet lamp disposed within the tubular packaging material.

2. The apparatus according to claim 1 wherein the excimer ultraviolet lamp emits a substantially monochromatic wavelength.

3. The apparatus according to claim 1 wherein the excimer ultraviolet lamp is composed of a quartz shell containing a gas, the gas selected from the group consisting of $Ar_2$, $Kr_2$, $Xe_2$, ARCl, KrCl, KrF and XeCl.

4. The apparatus according to claim 1 wherein the ultraviolet radiation source is cylindrical in shape and has the aperture through the center for cooling by a flowable food product.

5. The apparatus according to claim 1 wherein the tubular packaging material is sterilized at a rate of least twenty centimeters per second.

6. The apparatus according to claim 1 further comprising a sterilant application station for applying a sterilant to the tubular packaging material prior to irradiation by the excimer ultraviolet lamp.

7. An apparatus for sterilizing a partially-formed gable top carton, the apparatus comprising an ultraviolet radiation source having an aperture therethrough for cooling by a flowing contents, and the ultraviolet radiation source disposed within the partially-formed gable top carton.

8. A method for sterilizing a partially-formed gable top carton, the method comprising:
    passing the interior surface of the partially-formed gable top carton by an ultraviolet radiation source having an aperture therethrough, the ultraviolet radiation source emitting a radiation sufficient to substantially sterilize the partially-formed gable top carton; and,
    cooling the ultraviolet radiation source by moving a flowing contents through the aperture of the ultraviolet radiation source.

9. An apparatus for sterilizing a packaging material undergoing fabrication into a pouch on a form, fill and seal machine, wherein the container will be filled with a flowable food product, the apparatus comprising:
    an ultraviolet radiation source having an aperture therethrough for cooling by the flowable food product, the ultraviolet radiation source disposed on the form, fill and seal machine within the packaging material undergoing fabrication into a pouch.

10. An apparatus for sterilizing a packaging material undergoing fabrication into a parallelepiped container on a form, fill and seal machine, wherein the parallelepiped container will be filled with a flowable food product, the apparatus comprising:
    an ultraviolet radiation source having an aperture therethrough for cooling by the flowable food product, the ultraviolet radiation source disposed on the form, fill and seal machine within the packaging material undergoing fabrication into a parallelepiped container.

11. An apparatus for sterilizing a packaging material undergoing fabrication into a container on a form, fill and seal machine, wherein the container will be filled with a flowable food product, the apparatus comprising:
    a sterilant application station for applying a sterilant to the packaging material;
    an ultraviolet radiation source having an aperture therethrough for cooling by the flowable food product, the ultraviolet radiation source disposed on the form, fill and seal machine within the packaging material undergoing fabrication into a parallelepiped container, and disposed subsequent to the sterilant application station.

12. An apparatus for sterilizing a packaging material undergoing fabrication into a container on a form, fill and seal machine, wherein the container will be filled with a flowable food product, the apparatus comprising:
    an ultraviolet radiation source having an aperture therethrough for cooling by the flowable food product, the ultraviolet radiation source disposed on the form, fill and seal machine within the packaging material undergoing fabrication into a container, the ultraviolet radiation source disposed along the form, fill and seal machine subsequent to a longitudinal sealing of the packaging material, in flow communication with a filling tube and disposed prior to a transverse sealing of the packaging material.

13. A method for sterilizing a packaging material undergoing fabrication into a container on a form, fill and seal machine, wherein the container will be filled with a desired contents, the method comprising the following steps:
    subjecting the packaging material to a sterilant;
    passing the interior surface of the packaging material by an ultraviolet radiation source having an aperture, the ultraviolet radiation source emitting a radiation sufficient to substantially sterilize the packaging material; and, cooling the ultraviolet radiation source by flowing the desired contents through the aperture of the ultraviolet radiation source.

14. A method for sterilizing a packaging material undergoing fabrication into a container on a form, fill and seal machine, wherein the container will be filled with a desired contents, the method comprising the following steps:

passing the interior surface of the packaging material by an ultraviolet radiation source having an aperture, the ultraviolet radiation source emitting a radiation sufficient to substantially sterilize the packaging material;

cooling the ultraviolet radiation source by flowing the desired contents through the aperture of the ultraviolet radiation source; and forming the packaging material into a pouch.

15. A method for sterilizing a packaging material undergoing fabrication into a container on a form, fill and seal machine, wherein the container will be filled with a desired contents, the method comprising the following steps:

passing the interior surface of the packaging material by an ultraviolet radiation source having an aperture, the ultraviolet radiation source emitting a radiation sufficient to substantially sterilize the packaging material;

cooling the ultraviolet radiation source by flowing the desired contents through the aperture of the ultraviolet radiation source; and forming the packaging material into a parallelepiped container.

16. A method for sterilizing a packaging material undergoing fabrication into a container on a form, fill and seal machine, wherein the container will be filled with a desired contents, the method comprising the following steps:

passing the interior surface of the packaging material by an ultraviolet radiation source having an aperture, the ultraviolet radiation source emitting a radiation sufficient to substantially sterilize the packaging material, the ultraviolet radiation source disposed along the form, fill and seal machine subsequent to a longitudinal sealing of the material, in flow communication with a filling tube and prior to a transverse sealing of the packaging material; and cooling the ultraviolet radiation source by flowing the desired contents through the aperture of the ultraviolet radiation source.

17. A method for sterilizing a packaging material undergoing fabrication into a container on a form, fill and seal machine, wherein the container will be filled with a desired contents, the method comprising the following steps:

sealing the packaging material longitudinally;

passing the interior surface of the packaging material by an ultraviolet radiation source having an aperture, the ultraviolet radiation source emitting a radiation sufficient to substantially sterilize the packaging material;

cooling the ultraviolet radiation source by flowing the desired contents through the aperture of the ultraviolet radiation source;

sealing the packaging material transversely subsequent to the step of passing the interior surface of the packaging material by the ultraviolet radiation source thereby partially forming the container; and filling the partially formed container with the desired contents subsequent to the step of sealing the packaging material transversely.

18. An apparatus for sterilizing a packaging material being fabricated on a vertical form, fill and seal packaging machine, the apparatus in flow communication with a source of a flowable food product, the apparatus disposed subsequent to a longitudinal sealing station wherein the packaging material is sealed longitudinally to form a tubular packaging material and prior to a transverse sealing station wherein the tubular packaging material is sealed transversely, the apparatus comprising:

an excimer ultraviolet lamp having an aperture therethrough for cooling by the flowable food product, the excimer ultraviolet lamp disposed within the tubular packaging material.

19. The apparatus according to claim 18 wherein the excimer ultraviolet lamp is composed of a quartz shell containing a gas, the gas selected from the group consisting of $Ar_2$, $Kr_2$, $Xe_2$, ARCl, KrCl, KrF and XeCl.

20. The apparatus according to claim 18 wherein the ultraviolet radiation source is cylindrical in shape and has the aperture through the center for cooling by a flowable food product.

21. The apparatus according to claim 18 wherein the tubular packaging material is sterilized at a rate of least twenty centimeters per second.

22. The apparatus according to claim 18 further comprising a sterilant application station for applying a sterilant to the tubular packaging material prior to irradiation by the excimer ultraviolet lamp.

23. The apparatus according to claim 18 wherein the excimer ultraviolet lamp has an elliptical perimeter and has the aperture through the center for cooling by the flowable food product.

24. The apparatus according to 18 further comprising a folding station for forming a parallelepiped container from the packaging material.

25. The apparatus according to claim 24 wherein the packaging material is a fiberboard material coated with polyethylene on its exterior and interior surfaces.

* * * * *